(12) United States Patent
Farzone et al.

(10) Patent No.: US 10,969,464 B2
(45) Date of Patent: Apr. 6, 2021

(54) METHOD FOR REGISTERING PRESENCE OF A STATIONARY OBJECT EXHIBITING MOTION AT A LOCATION IN A SCENE MONITORED BY A RADAR DETECTOR

(71) Applicant: Axis AB, Lund (SE)

(72) Inventors: Mazdak Farzone, Lund (SE); Madeleine Boström, Lund (SE); Tobias Claesson, Lund (SE); Aras Papadelis, Lund (SE)

(73) Assignee: Axis AB, Lund (SE)

( * ) Notice: Subject to any disclaimer, the term of this patent is extended or adjusted under 35 U.S.C. 154(b) by 312 days.

(21) Appl. No.: 16/000,490

(22) Filed: Jun. 5, 2018

(65) Prior Publication Data

US 2018/0356496 A1    Dec. 13, 2018

(30) Foreign Application Priority Data

Jun. 8, 2017   (EP) .................................... 17175015

(51) Int. Cl.
| | |
|---|---|
| *G01S 7/292* | (2006.01) |
| *G01S 7/41* | (2006.01) |
| *G01S 7/02* | (2006.01) |
| *G01S 13/72* | (2006.01) |
| *G01S 13/52* | (2006.01) |
| *G01S 13/58* | (2006.01) |

(52) U.S. Cl.
CPC .............. *G01S 7/292* (2013.01); *G01S 7/024* (2013.01); *G01S 7/414* (2013.01); *G01S 13/52* (2013.01); *G01S 13/726* (2013.01); *G01S 13/589* (2013.01)

(58) Field of Classification Search
CPC ........ G01S 7/292; G01S 13/726; G01S 13/52; G01S 7/414; G01S 7/024; G01S 13/589; G01S 13/58

USPC .......................................................... 342/28
See application file for complete search history.

(56) References Cited

U.S. PATENT DOCUMENTS

| | | | |
|---|---|---|---|
| 5,128,684 A * | 7/1992 | Brown .................. | G01S 13/726 342/189 |
| 8,988,275 B2 | 3/2015 | Kisliansky et al. | |
| 9,316,727 B2 | 4/2016 | Sentelle et al. | |

(Continued)

FOREIGN PATENT DOCUMENTS

EP       2196820 A1    6/2010

OTHER PUBLICATIONS

European Search Report, EP Application No. 17175015.1, dated Dec. 19, 2017.

*Primary Examiner* — Bo Fan
(74) *Attorney, Agent, or Firm* — Volpe Koenig

(57) ABSTRACT

A method for, in a map of background objects, registering presence of a stationary object exhibiting motion at a location in a scene monitored by a radar detector comprising detecting over time radar echoes at a radar detector monitoring a scene. The moving object is one of a true moving object or a stationary object exhibiting motion. The over time detected radar echoes are evaluated for finding a stationary object exhibiting motion. The presence of the stationary object exhibiting motion is registered at a location, corresponding to the location of the stationary object exhibiting motion, in a map of background objects. A method for detecting moving objects using a radar detector is also presented wherein the map of background objects is used as input.

11 Claims, 9 Drawing Sheets

(56) References Cited

U.S. PATENT DOCUMENTS

| | | |
|---|---|---|
| 9,453,911 B2 | 9/2016 | Shiba |
| 9,563,813 B1 | 2/2017 | Smith |
| 2016/0025846 A1 | 1/2016 | Mostov |
| 2016/0042621 A1* | 2/2016 | Hogg ............... G08B 13/19615 348/155 |

* cited by examiner

METHOD FOR REGISTERING PRESENCE OF A STATIONARY OBJECT EXHIBITING MOTION AT A LOCATION IN A SCENE MONITORED BY A RADAR DETECTOR

FIELD OF INVENTION

The present invention relates to a method for registering presence of a stationary object exhibiting motion at a location in a scene monitored by a radar detector.

BACKGROUND

Methods for detecting motion are known in the art. One type of method relies on the use of Radar detectors for detecting velocity of moving objects in a scene monitored by the Radar detector. A challenge with such methods of the art is to achieve an efficient and reliable triggering event for the relevant types of moving objects. Part of the challenge has its origin in the fact that there are many stationary objects which exhibit motion in one respect or another, and thus may result in an erroneous, or at least unwanted, triggering event for a method detecting motion. Examples of such stationary objects exhibiting motion is flags, trees, bushes or the like. There is a need in the art for an improved method for detecting moving objects wherein the method has means for avoiding triggering on the stationary objects exhibiting motion.

SUMMARY

Mitigating, alleviating or eliminating one or more of the above-identified deficiencies in the art and disadvantages singly or in any combination and solve at least the above mentioned problem would be beneficial.

According to a first aspect, these and other problems are solved in full, or at least in part, by method for, in a map of background objects, registering presence of a stationary object exhibiting motion at a location in a scene monitored by a radar detector, the method comprising: detecting over time radar echoes at a radar detector monitoring a scene, wherein each radar echo comprises radar echo information pertaining to a location of a moving object within the scene and a velocity of the moving object, wherein the moving object is one of a true moving object or a stationary object exhibiting motion; evaluating the over time detected radar echoes for finding a stationary object exhibiting motion; registering presence of the stationary object exhibiting motion at a location, corresponding to the location of the stationary object evaluated as exhibiting motion, in a map of background objects.

The method may be advantageous as it allows for gathering data on objects within a scene which data may be used to improve the accuracy of a detection of moving objects within the scene. For example, by using the map of background objects, it may be possible to avoid triggering on the same object many times although the object is really a stationary object exhibiting motion.

The act of evaluating may comprise one or more of: connecting over time detected radar echoes, each associated with an apparent moving object within the scene, as originating from one specific moving object; determining a start position in the scene for the one specific moving object, the start position corresponding to the location of the first in respect of time of the detected radar echoes of the one specific moving object; determining a maximum deviation distance from the start position of the one specific moving object; upon the maximum deviation distance being less than a predetermined threshold, the one specific moving object being evaluated as a stationary object exhibiting motion. The method is advantageous as it provides a relatively easy yet robust way of determining whether or not a moving object is a stationary object exhibiting motion.

The act of evaluating may comprise one or more of: connecting over time detected radar echoes, each associated with an apparent respective moving object within the scene, as originating from one specific moving object; determining, based on positions in the scene for the one specific moving object, directions of motion of the one specific moving object, the positions corresponding to the locations of the over time detected radar echoes of the one specific moving object; determining directional shift angles between consecutive determined directions of motion of the one specific moving object; upon more than a predefined number of determined directional shift angles being higher than an angle threshold: the one specific moving object being evaluated as a stationary object exhibiting motion. The method is advantageous as it provides a relatively easy yet robust way of determining whether or not a moving object is a stationary object exhibiting motion.

The act of evaluating may be performed for radar echoes determined over a first predetermined time period.

The first predetermined time period may be in the range of 0.5-5 seconds.

The radar detector may be configured to detect radar echoes with a predetermined detection repetition frequency, and wherein the act of evaluating comprises evaluating a ratio between a number of radar echoes from moving objects corresponding to a specific location of the scene and a total number of radar detector samplings during the first time period, wherein the total number of radar detector samplings during the first time period equals the predetermined detection repetition frequency times the first predetermined time period.

The act of registering presence of the stationary object exhibiting motion at a location, corresponding to the location of the stationary object exhibiting motion, in a map of background objects may comprise: selectively registering presence of the stationary object exhibiting motion upon the ratio being higher than a movement threshold. This may allow for adjusting a sensitivity of the method for detecting a moving object. In a case where movement has only been detected in a few radar echoes, the method may be configured to disregard the detected moving object.

The act of registering presence of the stationary object exhibiting motion at a location, corresponding to the location of the stationary object exhibiting motion, in a map of background objects may comprise: registering presence of the stationary object exhibiting motion at a location, corresponding to the location of the stationary object exhibiting motion, in a writing map of background objects; and at predetermined times copying the registrations of locations of background objects of the writing map of background objects to a reading map of background objects and resetting the writing map of background objects.

The predetermined times may be a time separation within the range of minutes to hours. For example, in the range of 1 minute to 24 hours. Some non-limiting examples of time separation of 5 minutes, 20 minutes, 12 hours, and 24 hours.

The radar detector may be a Doppler radar detector configured to infer the velocity of the moving object by detecting a frequency shift between emitted radar signals and respective detected radar echoes.

According to a second aspect, there is provided a method for detecting moving objects using a radar detector, the method comprising: detecting a radar echo at the radar detector, wherein the radar echo comprises radar echo information pertaining to a location of a moving object within a scene and a velocity of the moving object, wherein the moving object is one of a true moving object or a stationary object exhibiting motion; comparing the radar echo information pertaining to a location of a moving object with locations of background objects in a map of background objects comprising background objects registered in accordance with the first aspect; upon the radar echo information pertaining to a location of a moving object does not correspond to a location of a background object in the map of background objects: indicating the radar echo as pertaining to a true moving object. The location of the moving object may pertain to a start position within the scene. Hence, the location of the moving object may be the position at which the moving object enters the scene.

According to a third aspect, there is provided a method for detecting moving objects using a video camera monitoring a scene, the method comprising: capturing, using the video camera, a video stream depicting the scene; analyzing the video stream using a motion detection algorithm for detecting a location of a moving object in the scene, wherein the moving object is one of a true moving object or a stationary object exhibiting motion; comparing the location of the moving object with locations of background objects in a map of background objects comprising background objects registered in accordance with the first aspect; upon the location of the moving object does not correspond to a location of a background object in the map of background objects: indicating the moving object as pertaining to a true moving object. The location of the moving object may pertain to a start position within the scene. Hence, the location of the moving object may be the position at which the moving object enters the scene.

The location of the moving object may be determined as corresponding to a location of a background object in the map of background objects upon the location at least partly overlapping the location of a background object in the map of background objects.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability will become apparent from the detailed description given below. However, it should be understood that the detailed description and specific examples, while indicating preferred embodiments, are given by way of illustration only, since various changes and modifications within the scope of the present teachings will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The present system and method will now be described more fully hereinafter with reference to the accompanying drawings, in which currently preferred embodiments are shown. However, the teachings may be embodied in many different forms and should not be construed as limited to the embodiments set forth herein; rather, these embodiments are provided for thoroughness and completeness, and fully convey the scope to the skilled person.

DETAILED DESCRIPTION OF THE PREFERRED EMBODIMENTS

Figure 1:
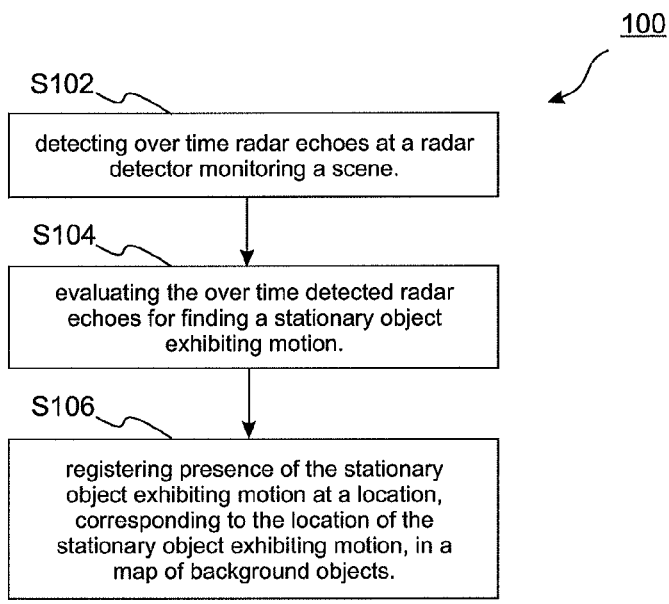
FIG. 1 shows a simplified flow chart of a method for, in a map of background objects, registering presence of a stationary object exhibiting motion at a location in a scene monitored by a radar detector according to some embodiments of the disclosure.
Figure 2:
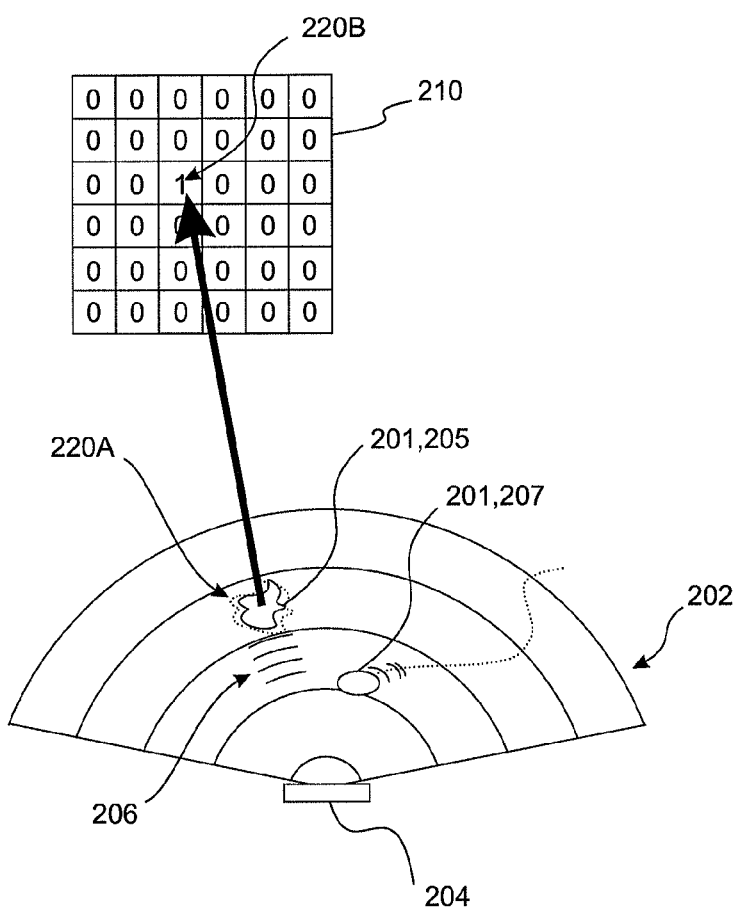
FIG. 2 shows a schematic view of the radar detector monitoring the scene illustrating a stationary object exhibiting motion resulting in a registration in a map for background objects.

A method will now be discussed in detail with reference to FIGS. 1 and 2. The method is intended for, in a map 210 of background objects, registering presence of a stationary object exhibiting motion 205 at a location in a scene 202 monitored by a radar detector 204.

Moving objects may either be a true moving object 207 or a stationary object exhibiting motion 205. A true moving object 207 is characterized by not being translationally fixed to the scene. Examples of true moving objects are, humans, animals, cars etc. A stationary object exhibiting motion 205 is characterized by being translationally fixed to the scene. Thus, a stationary object exhibiting motion 205 may rotate, vibrate and exhibit motion in any other way as long as it is fixed to the scene. This implies that a stationary object exhibiting motion 205 seldom enters or leaves the scene. Examples of a stationary object exhibiting motion 205 are trees, bushes, flag poles, flags, laundry lines, children swing sets, carrousels, loose tarpaulins etc.

The method 100 comprises the act of detecting S102 over time radar echoes 206 at the radar detector 204 monitoring the scene 202. Each radar echo comprises radar echo information pertaining to a location of a moving object 201 within the scene 202 and a velocity of the moving object 201. The velocity of the moving object 201 may be calculated by comparing two or more over time radar echoes. The radar detector 204 may be a Doppler radar detector configured to infer the radial velocity of the moving object 201 in relation to the radar detector 204 by detecting a frequency shift (i.e. the Doppler shift) between an emitted radar signal and a detected radar echo. By combining the velocity information derived from interpreting the Doppler shift and the velocity information derived by comparing the two or more over time radar echoes, the accuracy of the velocity information may be increased. The frequency of the emitted radar signal is, in the example, 24 kHz. However, radar signal having another frequency may as well be used.

The radar detector 204 may be configured to emit radar signals with a predetermined repetition frequency. Hence, the act of detecting S102 over time radar echoes 206 at the radar detector 204 may be performed at a predetermined repetition frequency. The repetition frequency for the example embodiment is 10 Hz. However, another repetition frequency may be used.

The method further comprises the act of evaluating S104 the over time detected radar echoes 206 for finding a stationary object exhibiting motion 205. There are various ways to perform the evaluation as will be further disclosed hereinbelow.

The method further comprises the act of registering S106 presence of the stationary object exhibiting motion 205 at a location 220B, corresponding to the location 220A of the stationary object exhibiting motion 205, in a map of background objects 210.

The map of background objects 210 may be a table or matrix structure. Such a table or matrix structure may be stored in a database and/or buffer memory for later retrieval.

Figure 3:
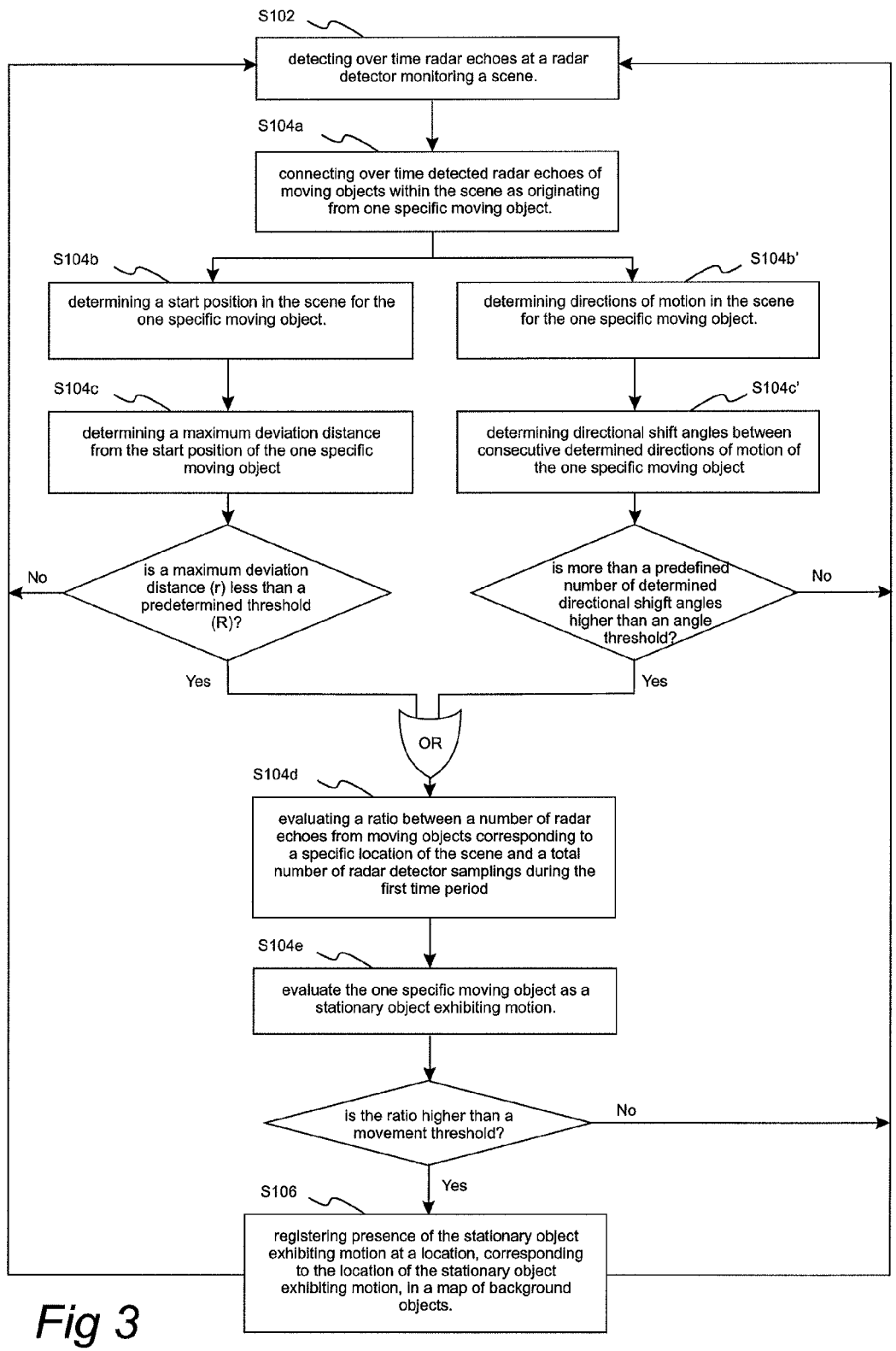
FIG. 3 shows a detailed flow chart of the method shown in FIG. 1.
Figure 4:
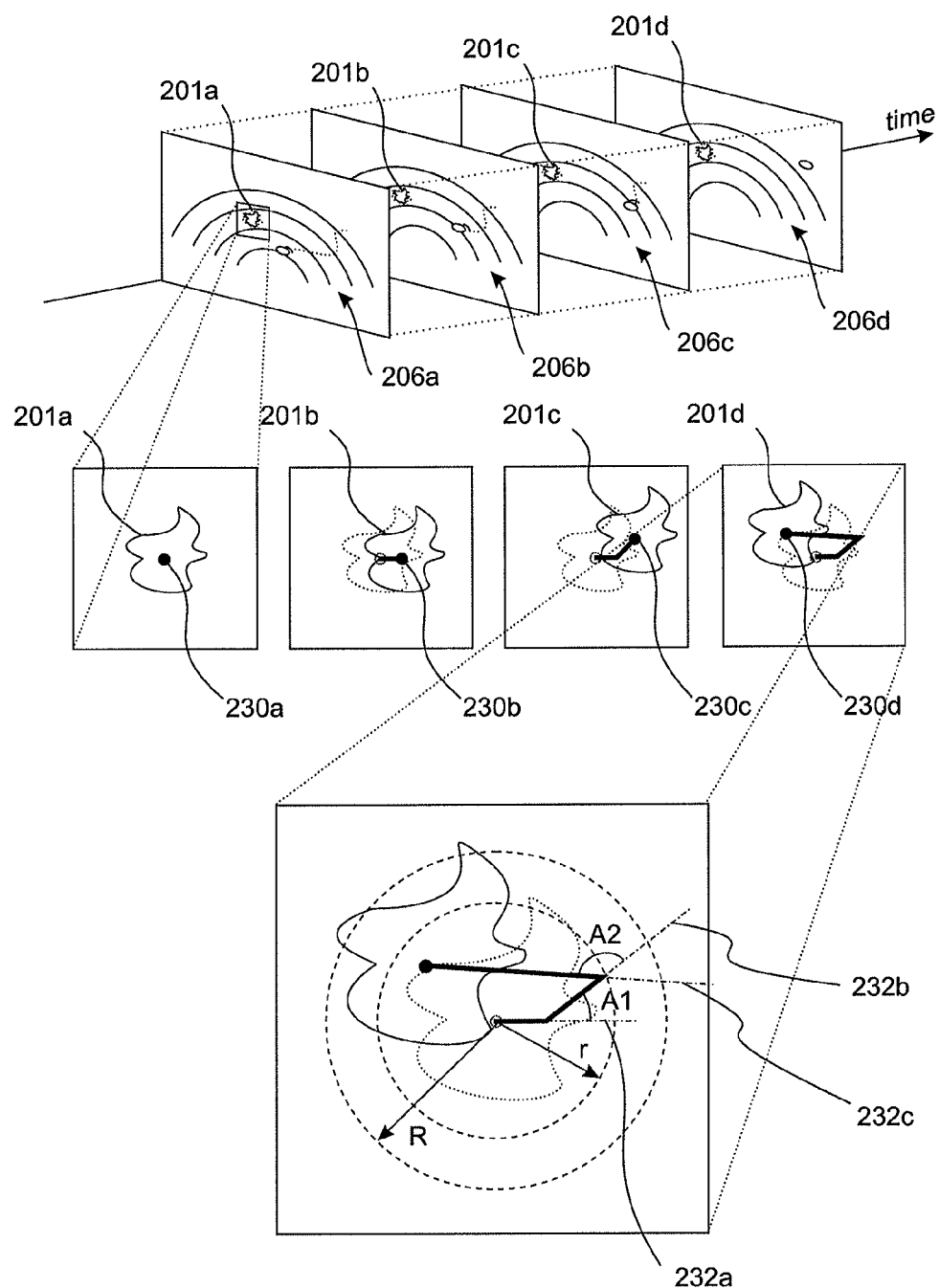
FIG. 4 shows example methodologies of evaluating whether a moving object is a stationary object exhibiting motion.
Figure 5:
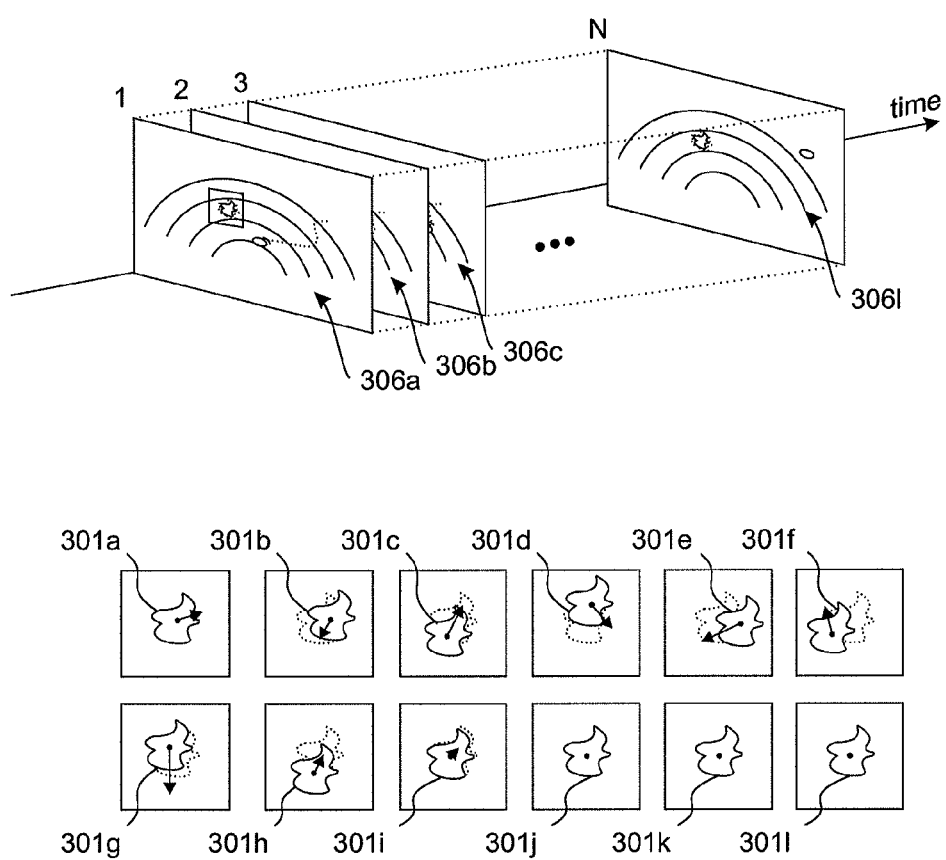
FIG. 5 illustrates an example of how the sensitivity of the method for detecting moving objects may be achieved.

The method will be discussed in more detail with reference to FIG. 3-6. FIG. 3 shows two examples of methodologies implemented to achieve the evaluation act S104. The two examples are based upon tracking the movement of a specific moving object 201.

The first example methodology relies on tracking a movement of the specific moving object 201 during a first predetermined time period T1. The first predetermined time period T1 may be in the range of seconds to minutes. For example, the first predetermined time period T1 may be in the range of 0.5-5 seconds. Specifically, the act of evaluating comprises the acts of connecting S104a over time detected radar echoes 206a-206d, each associated with an apparent respective moving object 201a-d within the scene 202, as originating from one specific moving object 201, see FIG. 4. The act of connecting S104a may be achieved by different methodologies available for motion tracking analysis. As an example, the over time radar echoes which are geometrically close to each other may be compared between two consecutive sampling frames. From the comparison, a velocity vector may be determined. By using the velocity vector, the expected position of the object in the upcoming consecutive sampling frame may be estimated and a part of a motion track can be calculated. The upcoming consecutive sampling frame is then analyzed to locate echoes that are close to the expected position of the object. If an object is located in the expected position, the motion track may be extended to cover the new position and speed by forming a weighted average between the existing track and the new measurement.

The act of evaluating comprises the act of determining S104b a start position 230a in the scene for the one specific moving object 201. The start position 230a corresponds to the location of the first in time 206a of the detected radar echoes 206a-206d of the one specific moving object 201. The act of evaluating further comprises the act of determining S104c a maximum deviation distance r from the start position 230a of the one specific moving object 201. Upon the maximum deviation distance r being less than a predetermined threshold R, the one specific moving object 201 is evaluated S104e as a stationary object exhibiting motion 205.

The second example methodology relies on determining the directional movement of the specific moving object 201 in the scene 202 during a first predetermined time period T1. Specifically, upon having connected S104a over time detected radar echoes 206a-206d, each associated with an apparent respective moving object 201a-201d within the scene 202, as originating from one specific moving object 201, the act of evaluating comprises the act of determining S104b', based on positions 230a-230d in the scene 202 for the one specific moving object 201, directions of motion 232a-232c of the one specific moving object 201. The positions 230a-230d corresponds to the locations of the over time detected radar echoes 206a-206d of the one specific moving object 201. The act of evaluating further comprises the act of determining S104c' directional shift angles A1, A2 between consecutive determined directions of motion 232a-232c of the one specific moving object 201. Upon more than a predefined number of determined directional shift angles A1-A2 being higher than an angle threshold: the one specific moving object 201 is evaluated S104e as a stationary object exhibiting motion 205.

The evaluation acts disclosed herein may be carried out in parallel or separately. Furthermore, as can be seen in FIG. 3, the decision to evaluate S104e the one specific moving object 201 as a stationary object exhibiting motion 205 may be taken either based upon the first methodology (including the route covering actions S104b' and S104c') or based upon the second methodology (including the route covering actions S104b' and S104c'). This is illustrated using the OR gate in FIG. 3. However, it should be understood that, in alternative embodiments, the decision to evaluate S104e the one specific moving object 201 as a stationary object exhibiting motion 205 may be taken based upon the first methodology (including the route covering actions S104b' and S104c') and the second methodology (including the route covering actions S104b' and S104c'). Thus, for such embodiments, the OR gate of FIG. 3 is instead an AND gate.

The sensitivity of the method for detecting moving objects may be varied. This will be further discussed with reference to FIG. 5. Specifically, the method 100 further comprises an act of evaluating S104d a ratio between a number of radar echoes 306a-306l from moving objects 301a-301l corresponding to a specific location of the scene 302 and a total number of radar detector samplings N during the first time period T1. The total number of radar detector samplings N during the first time period T1 equals the predetermined detection repetition frequency times the first predetermined time period T1. If the ratio is higher than a movement threshold, the presence of a stationary object exhibiting motion 205 can be selectively registered. The sensitivity is preset by adjusting the movement threshold.

Figures 6A, 6B:
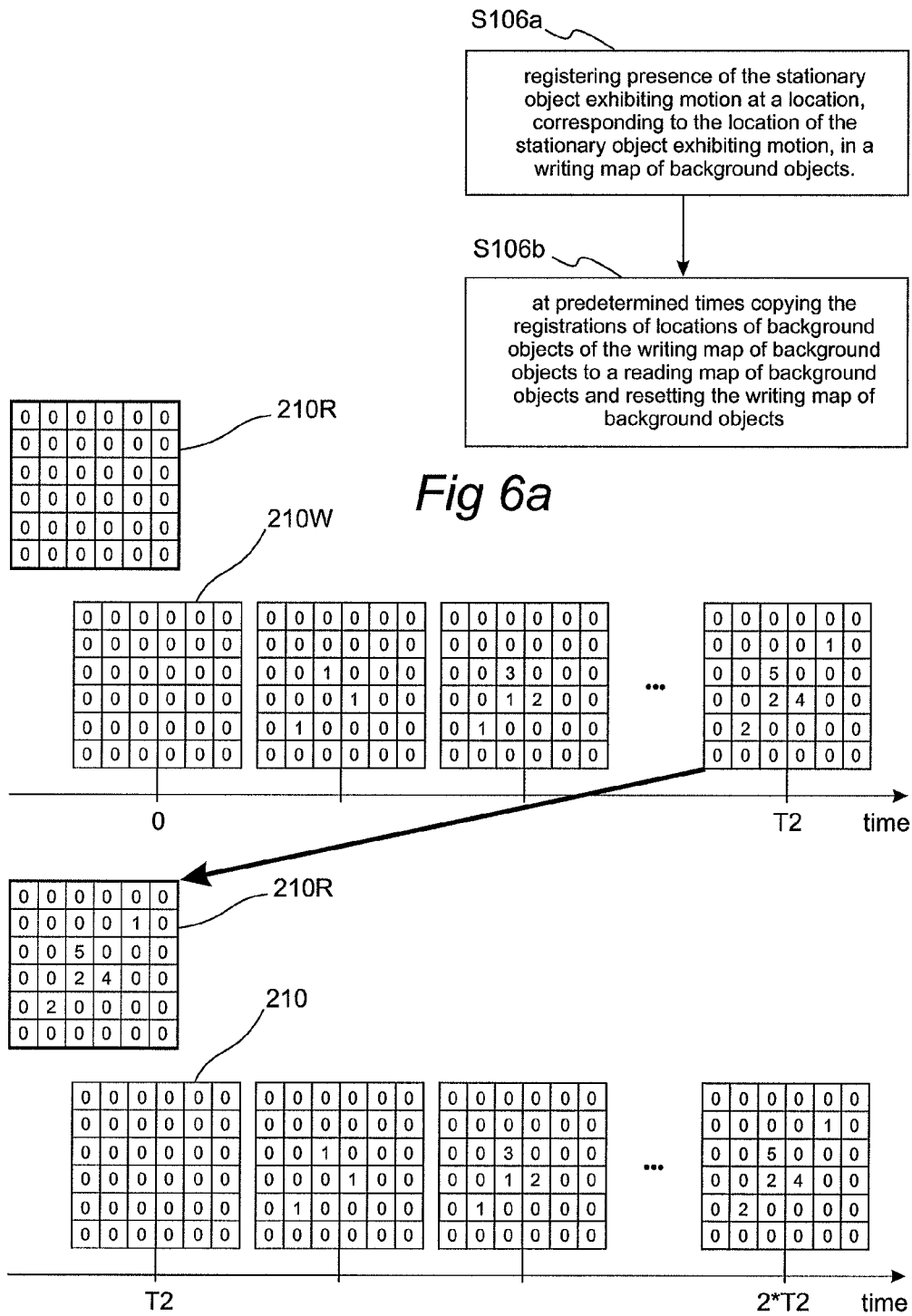
FIG. 6a is a flow chart of the registration act of the method according to embodiments for which two maps of background objects are used: a reading map and a writing map.
FIG. 6b illustrates how the reading and writing maps are updated as function of time.

To make the model adaptive, more than one map of background objects may be used. FIGS. 6a and 6b illustrate the registration act of the method when using two maps of background objects, a reading map 210W and a writing map 210R.

Specifically, the method 100 further includes the act of registering S106a presence of the stationary object exhibiting motion 205 at a location, corresponding to the location of the stationary object exhibiting motion, in a writing map 210W of background objects. Then, at predetermined times T2, the method includes the act of copying S106b the registrations of locations of background objects of the writing map 210W of background objects to the reading map 210R of background objects and resetting the writing map 210W of background objects. This way it will be possible to reset the map of background objects from time to time. Thus, the model will always be based upon what was detected the last time period. The predetermined times T2 may be longer than the predefined time period T1. The predetermined times T2 may be in the range of minutes to hours. For example, in the range of 1 minute to 24 hours or even several days. Some non-limiting examples of T2 is 5 minutes, 20 minutes, 12 hours, and 24 hours.

When the map of background objects 210 has been created, it may be used as input for other methods relating to monitoring the scene 202. There are many ways to use the gathered information contained in the map 210 of background objects. Specifically, two examples of such methods will be discussed herein.

Figure 7:
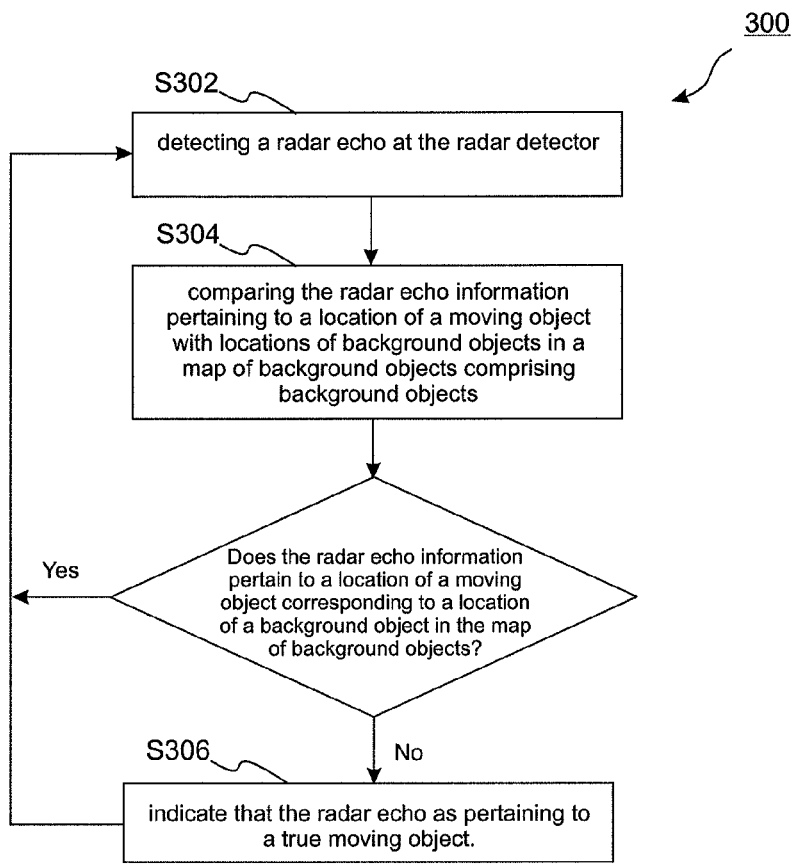
FIG. 7 shows a flow chart of a for detecting moving objects using a radar detector according to embodiments of the disclosure.

A first of these methods will now be discussed in detail with reference to FIG. 7. The method 300 is intended for detecting moving objects using a radar detector. Thus, the method relies on the same setup disclosed in FIG. 2.

The method 300 comprises the act of detecting S302 a radar echo at the radar detector 204, wherein the radar echo comprises radar echo information pertaining to a location of a moving object 201 within the scene 202 and a velocity of the moving object 201, wherein the moving object 201 is one of a true moving object 207 or a stationary object exhibiting motion 205.

The method 300 may further comprise the act of comparing S304 the radar echo information pertaining to a location of a moving object 201 with locations of background objects in a map 210 of background objects. The map 210 comprises background objects registered using a method for registering presence of stationary objects exhibiting motion as disclosed herein (for example the method 200). Thus, it is understood that the map 210 may be the reading map 210R.

Upon the radar echo information pertaining to a location of a moving object 201 does not correspond to a location of a background object in the map 210 of background objects: the radar echo is indicated S306 as pertaining to a true moving object 207.

Figure 8:
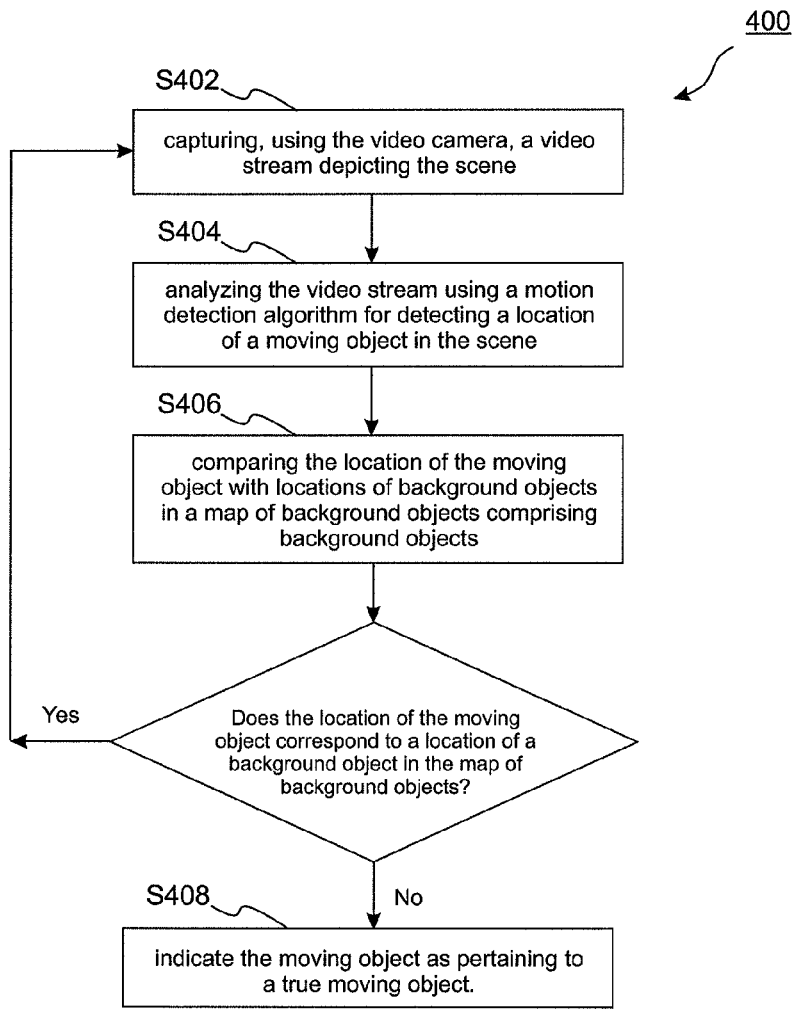
FIG. 8 shows a flow chart of a method for detecting moving objects using a video camera monitoring a scene according to embodiments of the disclosure.
Figure 9:
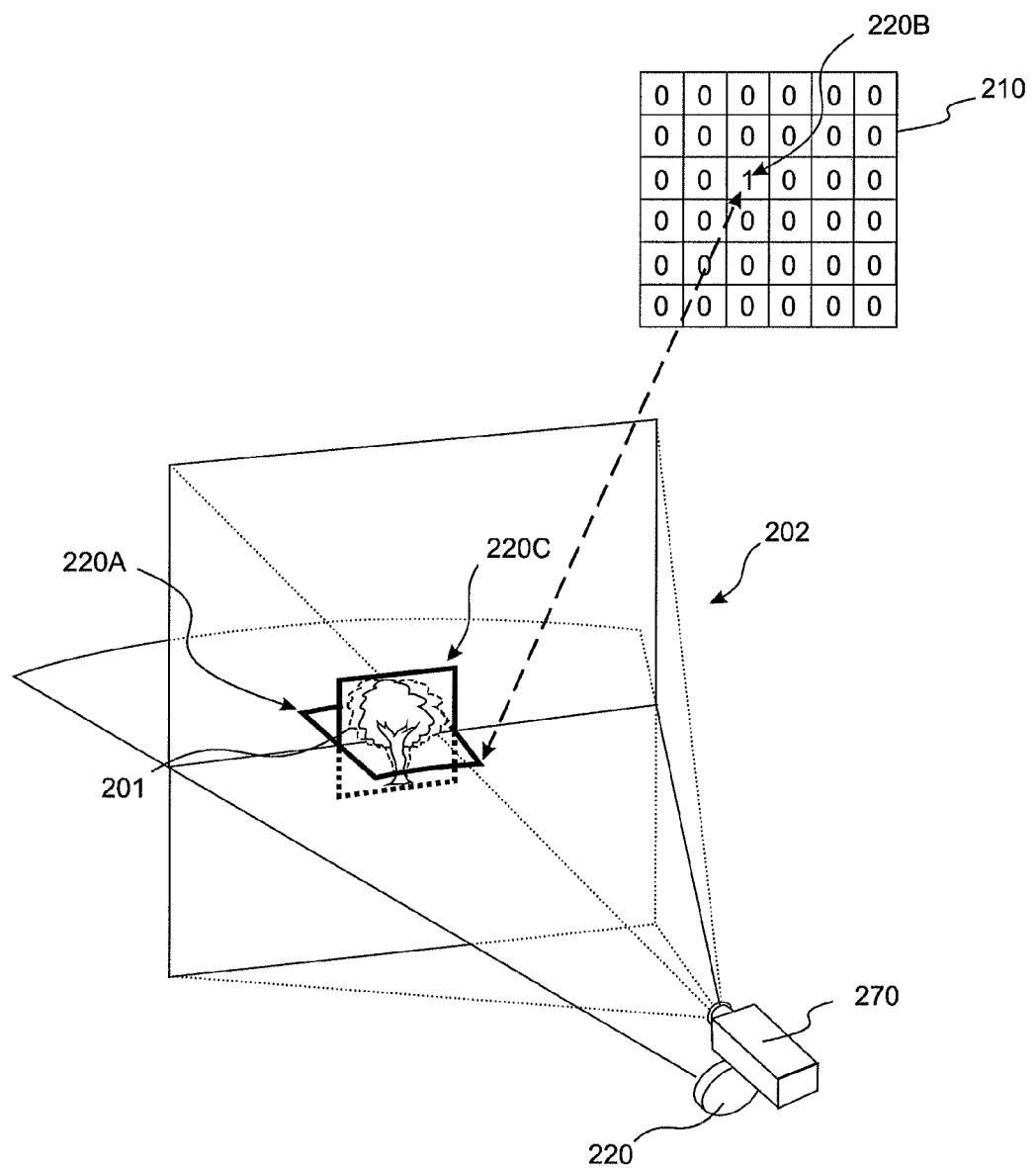
FIG. 9 is a schematic perspective view of a radar detector and a camera monitoring a scene carrying out the method shown in FIG. 8.

A method 400 will now be described in detail with reference to FIGS. 8 and 9. The method is intended for detecting moving objects using a video camera 270 monitoring a scene 202. The video camera 270 may be positioned at the same location as the radar detector 220, as shown in FIG. 9. However, alternative locations may be used.

The method comprises capturing S402, using the video camera 270, a video stream depicting the scene 202. The method further comprises analyzing S404 the video stream using a motion detection algorithm for detecting a location 220C of a moving object 201 in the scene 202. The moving object 201 is one of a true moving object 207 or a stationary object exhibiting motion 205. The motion tracking algorithm may be any motion tracking algorithm available for moving image sequences, utilizing for example matching of blocks, matching of objects, matching of interest points, optic flow etc.

Examples of motion tracking algorithms are not explicitly disclosed herein. It should be understood that many alternative ways exist for achieving said detection of a location 220C of a moving object 201 in the scene 202 within the scope of the claims.

The method 400 further comprises comparing the location 220C of the moving object 201 with locations 220B of background objects in a map 210 of background objects comprising background objects registered in accordance with a method for registering presence of a stationary object exhibiting motion, for example the method 200 disclosed hereinabove.

If the location 220C of the moving object 201 does not correspond to a location 220B of a background object in the map 210 of background objects, the moving object 201 is indicated as pertaining to a true moving object 207. This way the analysis of streaming video sequences for finding moving objects may be made more accurate. As soon as the map 210 of background objects discloses that an alleged moving object is indeed a stationary object exhibiting motion, an accidental registration of a moving object from the video stream may be avoided.

The person skilled in the art realizes that the present teachings by no means is limited to the preferred embodiments described above. On the contrary, many modifications and variations are possible within the scope of the appended claims.

For example, the act of evaluating the over time detected radar echoes 206 for finding a stationary object exhibiting motion 205 may comprise analyzing the frequency pattern of a moving object 201 from an analysis of a plurality of over time detected radar echoes. Furthermore, the act of evaluating may comprise analyzing a radar echo signal strength as function of time and/or the spatial distribution of the radar signal. For improving the adaptive nature of the method, more than one pair of reading and writing matrices may be used, each pair being configured to be reset at different predetermined times T2. For example, one pair may be configured to be reset at each new 5 minutes' interval and one further pair may be configured to be reset at each new 24-hour period.

Additionally, variations to the disclosed embodiments can be understood and effected by the skilled person in practicing the claimed teachings, from a study of the drawings, the disclosure, and the appended claims.

What is claimed is:

1. A method for detecting moving objects using a video camera monitoring a scene, the method comprising:
   capturing, using the video camera, a video stream depicting the scene;
   analyzing the video stream using a motion detection algorithm for detecting a location of a moving object in the scene, wherein the moving object is one of a true moving object or a stationary object exhibiting motion;
   comparing the location of the moving object with locations of background objects in a map of background objects comprising background objects being registered by:
      detecting over time radar echoes at a radar detector monitoring the scene, wherein each radar echo comprises radar echo information pertaining to a location of a moving object within the scene and a velocity of the moving object, wherein the moving object is one of a true moving object or a stationary object exhibiting motion, evaluating the over time detected radar echoes for finding a stationary object exhibiting motion, and registering a background object as a presence of the stationary object exhibiting motion at a location, corresponding to the location of the stationary object evaluated as exhibiting motion, in the map of background objects;

subsequent to determining the location of the moving object failing to correspond to a location of a background object in the map of background objects, indicating the moving object as pertaining to a true moving object.

2. The method according to claim 1, wherein the location of the moving object is determined as corresponding to a location of a background object in the map of background objects upon the location at least partly overlapping the location of a background object in the map of background objects.

3. The method according to claim 1, wherein the act of evaluating comprises:

connecting over time detected radar echoes, each associated with an apparent moving object within the scene, as originating from one specific moving object;

determining a start position in the scene for the one specific moving object, the start position corresponding to the location of the first in respect of time of the detected radar echoes of the one specific moving object;

determining a maximum deviation distance from the start position of the one specific moving object;

upon the maximum deviation distance being less than a predetermined threshold, the one specific moving object being evaluated as a stationary object exhibiting motion.

4. The method according to claim 1, wherein the act of evaluating comprises:

connecting over time detected radar echoes, each associated with an apparent respective moving object within the scene, as originating from one specific moving object;

determining, based on positions in the scene for the one specific moving object, directions of motion of the one specific moving object, the positions corresponding to the locations of the over time detected radar echoes of the one specific moving object;

determining directional shift angles between consecutive determined directions of motion of the one specific moving object;

upon more than a predefined number of determined directional shift angles being higher than an angle threshold:

the one specific moving object being evaluated as a stationary object exhibiting motion.

5. The method according to claim 1, wherein the act of evaluating is performed for radar echoes determined over a first predetermined time period.

6. The method according to claim 5, wherein the first predetermined time period is in the range of 0.5-5 seconds.

7. The method according to claim 5, wherein the radar detector is configured to detect radar echoes with a predetermined detection repetition frequency, and wherein the act of evaluating comprises:

evaluating a ratio between a number of radar echoes from moving objects corresponding to a specific location of the scene and a total number of radar detector samplings N during the first time period, wherein the total number of radar detector samplings during the first time period equals the predetermined detection repetition frequency times the first predetermined time period.

8. The method according to claim 7, wherein the act of registering presence of the stationary object exhibiting motion at a location, corresponding to the location of the stationary object exhibiting motion, in a map of background objects comprises:

selectively registering presence of the stationary object exhibiting motion upon the ratio being higher than a movement threshold.

9. The method according to claim 1, wherein the act of registering presence of the stationary object exhibiting motion at a location, corresponding to the location of the stationary object exhibiting motion, in a map of background objects comprises:

registering presence of the stationary object exhibiting motion at a location, corresponding to the location of the stationary object exhibiting motion, in a writing map of background objects; and at predetermined times copying the registrations of locations of background objects of the writing map of background objects to a reading map of background objects and resetting the writing map of background objects.

10. The method according to claim 9, wherein the predetermined times have a time separation within the range of minutes to hours.

11. The method according to claim 1, wherein the radar detector is a Doppler radar detector configured to infer the velocity of the moving object by detecting a frequency shift between emitted radar signals and respective detected radar echoes.

* * * * *